US009497616B2

(12) United States Patent
Noldus

(10) Patent No.: US 9,497,616 B2
(45) Date of Patent: Nov. 15, 2016

(54) METHODS AND APPARATUS IN A TELECOMMUNICATIONS NETWORK

(75) Inventor: Rogier August Caspar Joseph Noldus, Goirle (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 336 days.

(21) Appl. No.: 13/377,903

(22) PCT Filed: Jun. 18, 2009

(86) PCT No.: PCT/EP2009/057626
§ 371 (c)(1),
(2), (4) Date: Dec. 23, 2011

(87) PCT Pub. No.: WO2010/145707
PCT Pub. Date: Dec. 23, 2010

(65) Prior Publication Data
US 2012/0083265 A1 Apr. 5, 2012

(51) Int. Cl.
*H04W 40/00* (2009.01)
*H04W 8/08* (2009.01)
(Continued)

(52) U.S. Cl.
CPC ............ *H04W 8/08* (2013.01); *H04L 12/1485* (2013.01); *H04L 65/1016* (2013.01); *H04L 65/1069* (2013.01); *H04W 76/022* (2013.01)

(58) Field of Classification Search
CPC ..... H04W 92/02; H04W 88/16; H04W 8/06; H04W 36/0022; H04W 76/022; H04W 8/08; H04L 65/1069; H04L 12/66; H04L 12/1485; H04L 65/1016
USPC ........ 455/428, 445, 404.2, 433, 456.1–456.6
See application file for complete search history.

(56) References Cited

U.S. PATENT DOCUMENTS

2003/0081754 A1* 5/2003 Esparza et al. .......... 379/221.01
2003/0202521 A1* 10/2003 Havinis et al. ............... 370/401
(Continued)

FOREIGN PATENT DOCUMENTS

EP 2034681 A1 3/2009
RU 2346392 C2 2/2009
(Continued)

OTHER PUBLICATIONS

3RD Generation Partnership Project. "Technical Specification Group Core Network and Terminals; IP Multimedia (IM) Core Network (CN) Subsystem Centralized Services (ICS)," Stage 3, Release 9, 3GPP TS 24.292, Jun. 2009, Sophia-Antipolis Cedex, France.

*Primary Examiner* — Thai Vu
(74) *Attorney, Agent, or Firm* — Coats & Bennett, P.L.L.C.

(57) ABSTRACT

A method in a switching node of a circuit-switched telecommunications network comprises the steps of receiving from a packet-switched telecommunications network a request to establish a call towards a mobile station of the circuit-switched telecommunications network, and sending a request message to a location register for an instruction comprising one or more parameters for allowing the continuation of the establishment of the call to the mobile station. Upon receiving the one or more parameters from the location register, at least one of the one or more parameters is used to establish the call towards the mobile station. Furthermore, at least one of the one or more parameters is sent to the packet-switched telecommunications network. The at least one or more parameters sent to the packet-switched telecommunications network relates to the location of the mobile station. Therefore, entities within a packet-switched telecommunications network (e.g. an IMS network) that handle the terminating call for a call that is delivered to circuit-switched telecommunications network access (e.g. GSM), receive location information related to the connected party, i.e. the party (mobile terminal) receiving the call. This information is received transparently in SIP signalling.

10 Claims, 8 Drawing Sheets

(51) Int. Cl.
*H04L 12/14* (2006.01)
*H04W 76/02* (2009.01)
*H04L 29/06* (2006.01)

(56) References Cited

U.S. PATENT DOCUMENTS

2005/0266846 A1 12/2005 Kim
2007/0049281 A1* 3/2007 Chen et al. ................... 455/445
2008/0039104 A1* 2/2008 Gu .......................... H04W 8/04
  455/445
2009/0052385 A1* 2/2009 Sylvain et al. ............... 370/329
2010/0124897 A1* 5/2010 Edge .......................... 455/404.1

FOREIGN PATENT DOCUMENTS

RU  2369984 C2  10/2009
WO  2007027445 A2  3/2007

* cited by examiner

METHODS AND APPARATUS IN A TELECOMMUNICATIONS NETWORK

TECHNICAL FIELD

The present invention relates to methods and apparatus in a telecommunications network, and particularly relates to a method in a mobile switching node and a method in a location register of a telecommunications network, as well as the corresponding apparatus, for providing location information of a called mobile terminal.

BACKGROUND

The IP Multimedia Subsystem (IMS) is an architectural framework for delivering Internet Protocol (IP) multimedia services. It constitutes an approach to providing internet based multimedia services, including voice calls and messaging, to various wireless telecommunications networks, such as Global System for Mobile Communications (GSM), wireless LAN, and Universal Mobile Telecommunications System (UMTS), as well as fixed line networks. One of the protocols used in the IMS network is the Session Initiation Protocol (SIP). A terminal used with the IMS network is referred to as SIP terminal.

FIG. 1 shows the architecture for handling a terminating IMS call, whereby the call is offered to a GSM terminal of the called subscriber. FIG. 1 also shows a SIP terminal; the called subscriber may have both a GSM terminal and a SIP terminal. This architecture is used for IMS Mobility (also known as Multi Access Extension, MAE). A subscriber of such a network service, i.e. an MAE subscriber, has access to IMS services and may use a GSM terminal or a SIP terminal for call establishment and call reception. The subscriber may receive a call and answer that call on his GSM terminal or on his SIP terminal.

The Serving Call Session Control Function (S-CSCF) is an entity in the IMS network that handles incoming and outgoing calls in the IMS network. In FIG. 1, an S-CSCF 10 receives an incoming call establishment request message destined for an MAE subscriber, who has a GSM terminal and a SIP terminal. The call may be offered on both the MAE subscriber's GSM terminal and the MAE subscriber's SIP terminal. For the offering of the call to MAE subscriber's SIP terminal, the S-CSCF 10 communicates with a proxy CSCF (P-CSCF) 12 using SIP, and the P-CSCF 12 forwards the call establishment request message to the SIP terminal 14. The S-CSCF uses, for above-described routing of the call towards P-CSCF and SIP terminal, a contact address that the SIP terminal had previously deposited in the S-CSCF, during the registration of the SIP terminal in the IMS network.

For the offering of the call to MAE subscriber's GSM terminal 24, the S-CSCF 10 communicates with a Media Gateway Controller (MGC) 16, using SIP signalling. The MGC 16 contains a Media Gateway Control Function (MGCF), which, among others, converts the SIP signalling into ISUP signalling (ISDN user part, a call establishment signalling protocol for ISDN networks and GSM networks). That is, the MGC 16 terminates the SIP signalling from the IMS core network and establishes the terminating call leg in the GSM network, towards the called subscriber's GSM terminal. The MGC 16 sends a call establishment request message to the Gateway Mobile Services switching Centre (GMSC) 18 in the GSM network. This call establishment request message may be an ISUP Initial Address Message (IAM). The GMSC 18 requires routing information in order to be able to forward the call towards the Mobile Services switching Centre (MSC) currently serving the GSM terminal 24. Hereto, the GMSC communicates, using MAP (Mobile Application Part) signalling, with a Home Location Register (HLR) 20. The HLR 20 is a database that contains subscription and location details of the subscribers that are authorized to use the GSM network that this HLR forms part of. The HLR 20 receives the MAP signalling message from the GMSC 18 and requests routing information, in the form of a Mobile Station Roaming Number (MSRN), from a visited MSC (VMSC) 22. The VMSC has a Visitor Location Register (VLR, not shown) integrated in it. The HLR stores the VMSC address for each subscriber of the network. That facilitates the HLR to contact the VMSC for requesting an MSRN. The VMSC 22 supplies the MSRN of the called GSM terminal 24 back to the HLR 20, and the HLR 20 forwards this to the GMSC 18. The GMSC 18 may then use the MSRN to forward the call to the VMSC 22; the VMSC may then offer the call to the GSM terminal 24.

The MGCF may be located in a separate device, the MGC 16, as described here, or incorporated within the GMSC 18 in which case the S-CSCF 10 communicates directly with the integrated MGCF & GMSC.

When a subscriber has answered a call, it is important for the operator to know on which device the call was answered and, especially in the case of answering the call on a GSM terminal, the location of the GSM terminal. The location of the GSM terminal, when answering the call, may be used for, among other things, terminating call charging. When a call is answered on a GSM terminal, there may be cost associated with it, especially when the person answering the terminal is currently residing in a foreign network, i.e. the location of the GSM terminal at the time of answering the call is important information. When a call is answered on a SIP terminal, there are normally no charges associated with this terminating call.

Within SIP, the location of a terminal may be reflected in a designated SIP header in SIP request messages and SIP response messages. This header is the P-access-network-info (PANI) header. The SIP terminal in FIG. 1 may for example report its location when returning SIP messages to the P-CSCF 12 when answering a call. The PANI is defined in IETF RFC 3455. 3GPP has specified further enhancements to PANI in 3GPP TS 24.229, to cater for a variety of access network types.

A problem with the contemporary solution for offering a call to multiple terminals, including a GSM terminal, is that the MGCF does not have access to any location information of the called subscriber's GSM terminal 24. Hence, the SIP signalling generated by the MGC 16 towards the IMS core network, more specifically, response messages such as 180 Ringing, 183 Session Progress or 200 Ok, do not contain the PANI header. Therefore, it is not possible to provide the called subscriber's GSM terminal location information transparently, i.e. within the call establishment signalling, to the IMS core network with the current network implementation.

The SIP response(s) generated by the MGC 16, related to the SIP Invite message sent from the S-CSCF 10 toward the GSM terminal via MGCF, will contain a Contact header. The Contact header is a designated SIP header comprising an address that can be used for addressing subsequent address messages to that entity (MGCF), for the remainder of the SIP dialogue. The Contact header may be placed in a charging record that is generated by entities such as S-CSCF or SIP application server. The charging record may be used off line, to determine whether the subscriber answered the call on his/her SIP terminal 14 or on his/her GSM terminal 24. However, the Contact address from the MGC 16 will typically be an IP address of that MGCF; this follows from the fact that the SIP signalling terminates in the MGCF. The MGCF converts the SIP signalling into ISUP signalling. Using this MGCF Contact address to determine whether the call was answered on a GSM terminal would require that the IP address of the MGC 16 be configured in the off line charging system, to be able to recognize it as an address associated with the MGC 16 and hence to ascertain that the call was answered on a GSM terminal. This method of using Contact address is further hampered by the fact that the signalling between S-CSCF 10 and the MGC 16 may traverse an Interconnect Border Control Function (IBCF, not shown) replacing the Contact header. An IBCF is used as border gateway between two IMS networks or between an IMS network and a circuit switched (CS) network such as a GSM network. This method of using Contact address also does not provide any location information of the GSM terminal 24. The Contact address relates to the MGCF and is not related to the location of the GSM terminal.

This limitation of the current solution has the effect that the IMS core network has insufficient capability for terminating call handling (it does not know the location of the called subscriber's GSM terminal and hence cannot act on it within service logic processing) and has the further effect that charging record correlation may be needed to correlate GSM charging records, containing the location information, with IMS based charging records, containing other relevant data of the call. Correlation of charging records of the IMS network with charging records of the GSM network is technically feasible, but is generally costly and processing intensive.

Various solutions exist for providing location information of the called party's GSM terminal to the IMS network.

As shown in FIG. 1, the S-CSCF 10 has access to at least one IMS service 26, such as IP Centrex (network based PBX), that is controlling the terminating call to the IMS subscriber. The IMS service 26 might apply a Subscriber location query using Any Time Interrogation (ATI), which is a MAP procedure specified in the CAMEL standard. By using ATI, the IMS service may obtain the subscriber location (Cell Id and/or geographic coordinates) and the subscriber status (Idle, Busy, Detached).

The IMS service 26 would send MAP ATI directly to the HLR 20, which sends a MAP Provide Subscriber Information (PSI) message to the VMSC 22. The VMSC 22 provides the requested information to the HLR 20, which forwards the information directly to the IMS service 26.

This method of using ATI has the following disadvantages:

IMS services like IP Centrex or similar, do not generally support SS7 protocol stack, so cannot support MAP operations. Implementing SS7 in these service nodes is often not feasible or is expensive.

When the IMS service 26 is handling a terminating call to a subscriber, it may not know what device(s) the subscriber has, i.e. the IMS service 26 would not know whether the subscriber has a GSM device, possibly in combination with a SIP device. The fact that the IMS service does not have this knowledge available is intrinsic to the IMS network architecture. The public user identity that is used to call the subscriber, e.g. sip:john.smith@company.se or tel:+46702983789 is not an indication of the type of terminal used by the subscriber.

Should the IMS service 26 apply MAP ATI and obtain the subscriber's GSM terminal location, then even when the call is established to the subscriber, the IMS service 26 may still not know whether the call was answered on the GSM terminal 24 or on the SIP terminal 14. As explained earlier, this knowledge is important for the purpose of charging.

Applying the location query prior to establishing the call to the subscriber results in additional call establishment time.

When using ATI for the purpose of obtaining the called party's location information, such ATI query would need to be performed for each and every IMS service that needs this information. Multiple IMS services may be invoked for a call to an IMS subscriber.

There is therefore a need for an improved method and apparatus for providing location information of a mobile terminal from the GSM network to the IMS network.

SUMMARY

It is an object of the present invention to provide information to the IMS network, related to the location of the called party when the called party is receiving the call on a GSM terminal. The IMS network may use this information during the handling of the terminating call to the called party. The information is provided to the IMS network in a transparent manner, using enhancements to existing signalling, without the need for additional signalling or additional procedures.

According to one aspect of the present invention, there is provided a method in a switching node of a circuit-switched telecommunications network, comprising the steps of receiving from a packet-switched telecommunications network a request to establish a call towards a mobile terminal of the circuit-switched telecommunications network, and sending a request message to a location register for an instruction comprising one or more parameters for allowing the continuation of the establishment of the call to the mobile terminal. Upon receiving the one or more parameters from the location register, at least one of the one or more parameters is used to establish the call towards the mobile terminal. Furthermore, at least one of the one or more parameters is sent to the packet-switched telecommunications network. The at least one or more parameters sent to the packet-switched telecommunications network relates to the location of the mobile terminal.

According to another aspect of the present invention, there is provided a mobile switching node for use in a circuit-switched telecommunications network. The mobile switching node comprises: first interface circuitry for interfacing with a packet-switched telecommunications network, configured to receive from a packet-switched telecommunications network a request to establish a call towards a mobile terminal of the circuit-switched telecommunications network; second interface circuitry for interfacing with a location register, configured to send a request message to the location register for an instruction comprising one or more parameters for allowing the continuation of the establishment of the call to the mobile terminal, and configured to receive the one or more parameters from the location register; and third interface circuitry for interfacing with a remote mobile switching node, configured to use at least one of the one or more parameters to establish the call with the mobile terminal. The first interface circuitry is further configured to send at least one of the one or more parameters to the packet-switched telecommunications network, the at least one of the one or more parameters being related to the location of the mobile terminal.

According to another aspect of the present invention, there is provided a method in a location register of a circuit-switched telecommunications network. The method comprises the steps of: receiving, as part of a procedure to establish a call towards a mobile terminal, a first request message from a first switching node for an instruction comprising one or more parameters allowing the continuation of the establishment of the call to the mobile terminal; sending at least one second request message to a second switching node for a mobile station roaming number (MSRN) to be used for the establishment of the call towards the mobile terminal; receiving at least one response message from the second switching node, the at least one response message containing the MSRN; and sending to the first switching centre the MSRN. The at least one second request message contains a request for information related to the location of the mobile terminal, and the at least one response message contains information related to the location of the mobile terminal. The location information related to the mobile terminal is sent to the first switching centre.

According to another aspect of the present invention, there is provided a location register for a circuit-switched telecommunications network. The location register comprises: first interface circuitry for interfacing with a first mobile switching node, configured to receive, as part of a procedure to establish a call towards a mobile terminal, a first request message from the first mobile switching centre for an instruction comprising one or more parameters allowing the continuation of the establishment of the call to the mobile terminal; and second interface circuitry for interfacing with a second mobile switching node, configured to send at least one second request message to the second mobile switching node for a mobile station roaming number (MSRN) of the mobile terminal, and configured to receive from the second mobile switching node the MSRN of the mobile terminal. The first interface circuitry is further configured to send to the first mobile switching node the MSRN of the mobile terminal. Furthermore, the at least one second request message is also for location information of the mobile terminal. The second interface circuitry is configured to receive, from the second mobile switching node, location information of the mobile terminal. The first interface circuitry is configured to send, to the first mobile switching node, the location information of the mobile terminal.

The invention has the advantage that, entities within a packet-switched telecommunications network (e.g. an IMS network) that handle a terminating call for a call that is delivered to circuit-switched telecommunications network access (e.g. GSM), receive location information related to the connected party, i.e. the party (terminal) receiving the call. This information is received transparently in Session Initiation Protocol (SIP) signalling. Examples of SIP entities benefiting from this method are Serving Call Session Control Function (S-CSCF) and SIP application server (SIP-AS); the SIP-AS may e.g. contain a Virtual Private network (VPN) service, a multimedia telephony application or a charging application.

Receiving the destination terminal's location information transparently has the advantage that the packet-switched telecommunications network entity does not have to perform further action to obtain the called subscriber's location information.

A further advantage is that no post-processing of call detail records (CDR) is needed. The invention may therefore constitute a substantial reduction in complexity.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 1:
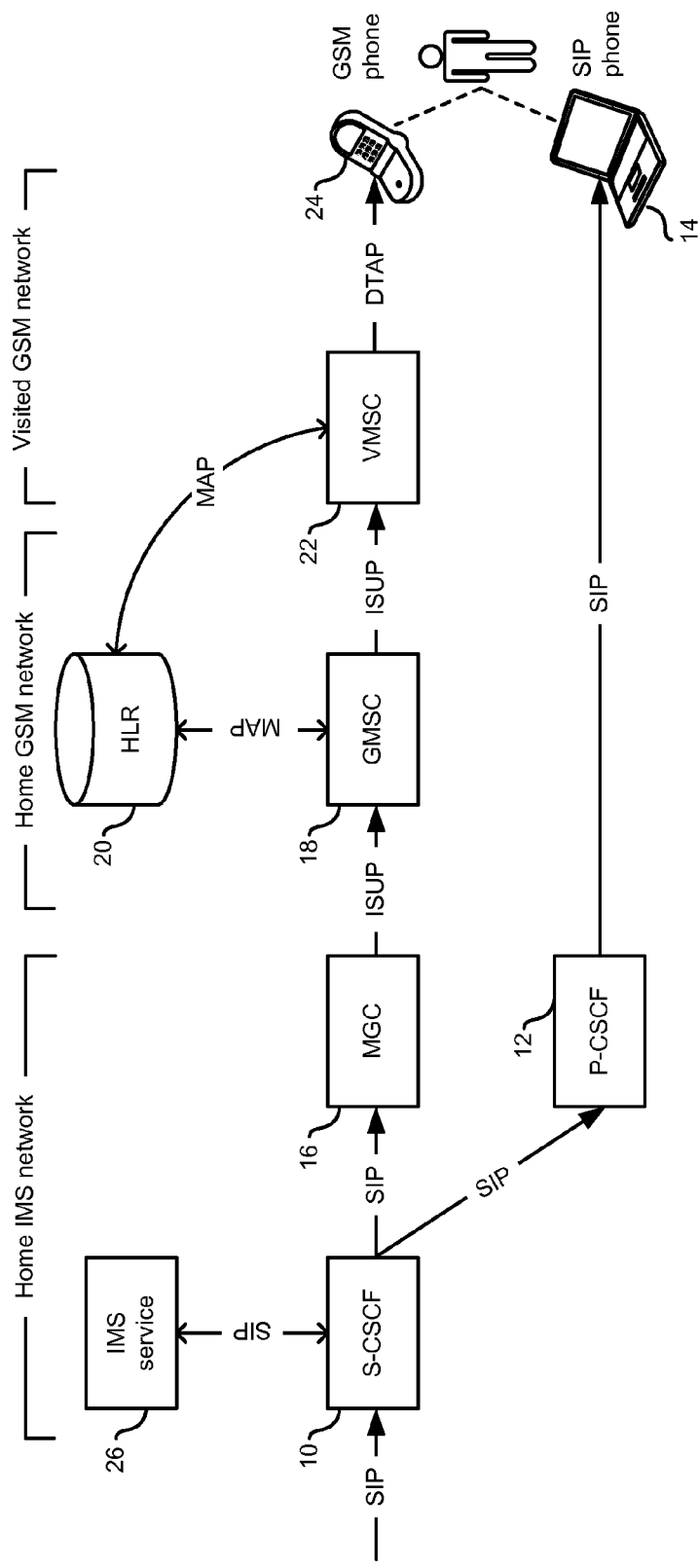
FIG. 1 shows an architecture for handling a terminating IMS call.
Figure 2:
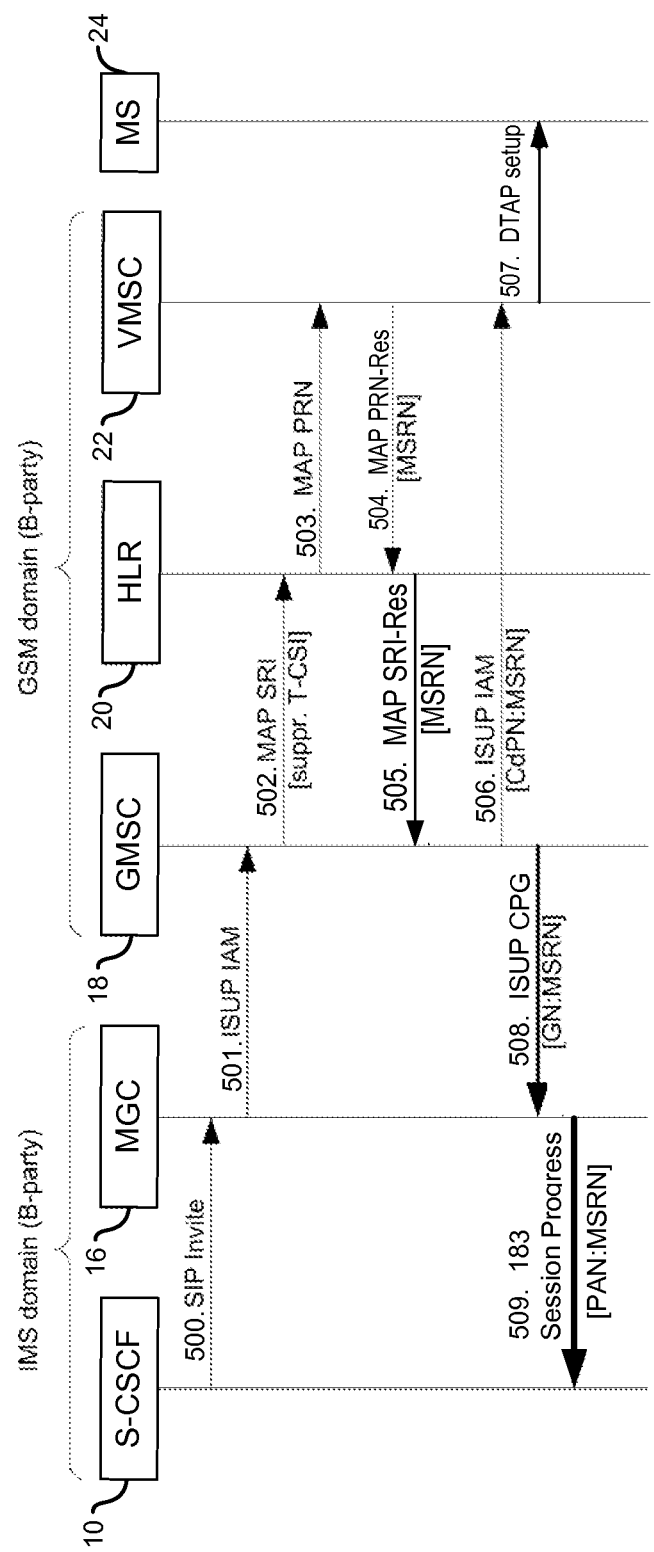
FIG. 2 is a signalling diagram of a method in accordance with an embodiment of the present invention.

FIG. 2 is a signalling diagram showing a method in accordance with an embodiment of the present invention. The signalling is for use within the architecture described with respect to FIG. 1. It will be appreciated, however, that the invention is not limited to such an architecture and its associated signalling, but may also be applicable to other architectures and associated signalling.

In order to establish a call towards a Global System for Mobile communications (GSM) mobile terminal, the Serving Call Session Control Function (S-CSCF) 10 sends a session establishment request message 500 to the Media Gateway Controller (MGC) 16, in the form of a Session Initiation Protocol (SIP) Invite message. The MGC terminates the SIP signalling (i.e. acts as a termination point for the SIP signalling), and converts the information into Integrated Services Digital Network (ISDN) User Part (ISUP) signalling for communication with the circuit-switched telecommunications network. The MGC 16 sends an ISUP IAM (Initial Address Message) 501 to the GMSC 18 in order to establish the call towards the called subscriber.

The Gateway Mobile Switching Centre (GMSC) 18 requires an instruction comprising one or more parameters in order to be able to continue the establishment of the call. For example, the GMSC 18 requires at least a Mobile Station Roaming Number (MSRN) in order to establish the call. The GMSC 18 therefore uses Mobile Application Part (MAP) signalling to communicate with the Home Location Register (HLR) 20. A MAP SRI (Send Routing Information) message 502 is sent to the home location register 20 in order to obtain an instruction. In addition, the GMSC 18 may at this point suppress the "terminating CAMEL subscription information" (T-CSI), to prevent the call from looping back to the packet-switched telecommunications network. That is, the T-CSI for a subscriber may indicate that a Customized Applications Mobile network Enhanced Logic (CAMEL) service shall be invoked for a terminating call to that subscriber. The terminating call CAMEL service may be used for routing a terminating call to that subscriber, when that call is established in or routed through the circuit-switched domain, to the packet-switched telecommunications network. When the packet-switched telecommunications network wants to deliver the call to the GSM terminal (for example) of that subscriber, the requesting of T-CSI is suppressed in GMSC, to prevent looping back to the packet-switched telecommunications network. Instead, this time the GMSC wants to receive a MSRN from the HLR. Hence, the GMSC 18 includes 'suppress T-CSI' in the query to the HLR 20. The GMSC may determine from designated routing information contained in the call establishment request message received from MGC, that this call establishment request message relates to a call destined for a GSM subscriber's terminal and that therefore the T-CSI shall be suppressed.

Instead of using CAMEL, other, non-standard techniques may be used for the 'overlay' (routing) from the circuit-switched telecommunications network to the packet-switched telecommunications network, such as Terminating IN Category Key (TICK). In such a case, the GMSC 18 would be instructed, when the packet-switched telecommunications network wants to deliver the call to the GSM mobile terminal of that subscriber, to include 'suppress TICK' in the query to the HLR 20. Those skilled in the art will appreciate that any of a number of methods may be used to prevent 'looping back' to the packet-switched telecommunications network in such a scenario.

On receipt of the MAP SRI message, the HLR 20 sends a MAP PRN (Provide Roaming Number) message 503 to the Visited Mobile Switching Centre node (VMSC) 22, requesting the necessary routing information (i.e. a mobile station roaming number). The result is returned in a MAP PRN-Res message 504. The HLR keeps track of the MSC where the subscriber is registered, so knows to which MSC to send the MAP PRN.

The HLR 20 returns the MSRN to the GMSC 18 in a MAP SRI-Res message 505. The GMSC 18 then uses the MSRN to establish the call towards the VMSC 22, using the MSRN in the Called Party Number field in the ISUP IAM 506. The VSMC 22 then establishes the call towards the GSM mobile terminal 24 by using DTAP Setup messages (Direct Transfer Application Part) 507.

In addition, however, in accordance with embodiments of the present invention, the GMSC 18 returns the MSRN to the packet-switched telecommunications network. The MSRN has the form of a routing number, representing the address of the MSC currently serving the destination (GSM) subscriber. Hence, the MSRN may serve as an indication of the geographical location of the destination subscriber, including the country or region in which the destination subscriber resides.

The MSRN may be returned to IMS in a number of ways. In the illustrated embodiment, the MSRN is returned by the GMSC 18 in an ISUP CPG (call progress) message 508. For example, the MSRN may be conveyed as a Generic Number (GN being an information element used in ISUP for conveying a network number of designated kind) within the ISUP CPG message 508, with a designated number qualifier (this being an indication embedded inside the header of the GN, indicating the kind of number conveyed in this GN). The MGC 16 may then forward the information to the S-CSCF 10 within the P-access-network-info (PANI) header of a 183 Session Progress message 509, for example.

Figure 3:
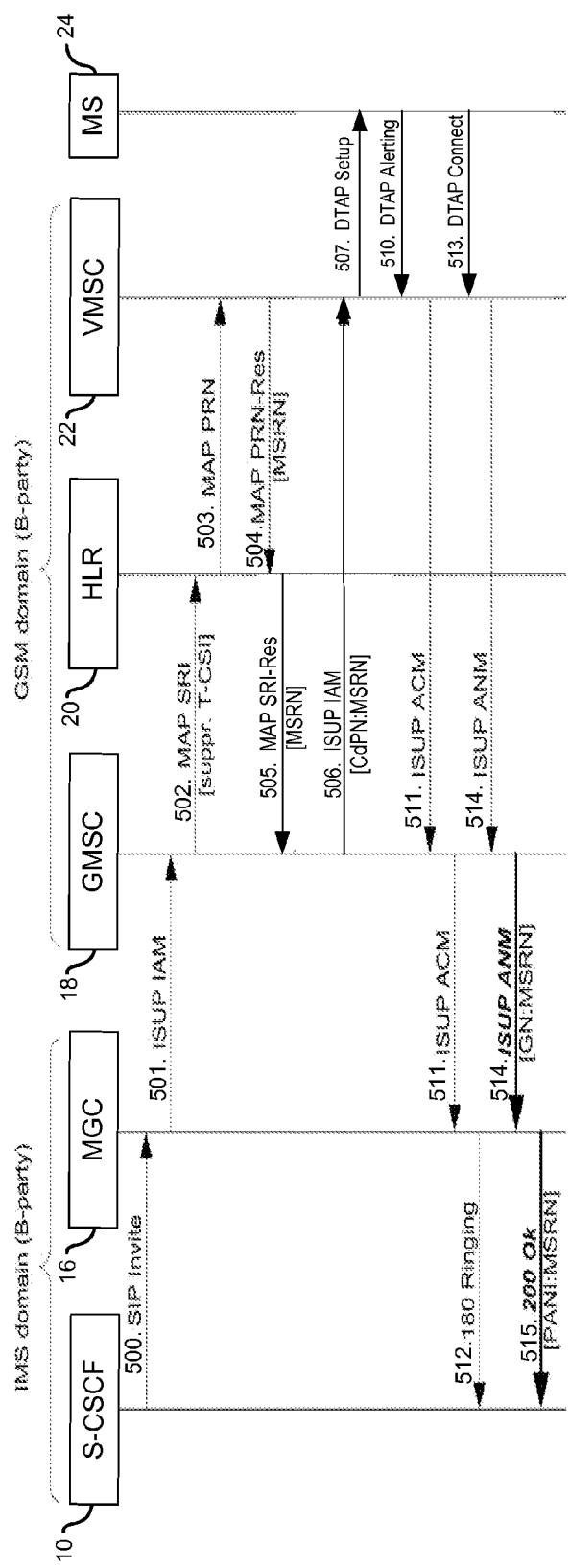
FIG. 3 is a signalling diagram of a method in accordance with another embodiment of the present invention.

FIG. 3 illustrates an alternative embodiment, whereby the MSRN is conveyed to the packet-switched telecommunications network without using an additional intermediate message (i.e. such as the ISUP CPG message 508). In this embodiment, the MSRN is conveyed within the PANI header of an Answer message, which is necessarily transmitted as part of the call establishment process, thus reducing the amount of ISUP signalling and SIP signalling required.

As can be seen, the method illustrated in FIG. 3 is substantially identical to that shown in FIG. 2. However, as part of the call establishment process, a DTAP alerting signal 510 is passed from the GSM mobile terminal 24 back to the VMSC 22; this signal is converted to an ISUP ACM message (Address Complete Message) 511 and sent to the MGC 16 via the GMSC 18. The MGC 16 converts the message to SIP signalling and transmits a 180 Ringing message 512 to the S-CSCF 10. Once the call is connected, the GSM mobile terminal 24 transmits a DTAP Connect message 513 to the VMSC 22; this is converted to an ISUP ANM (ANswer Message) 514 and transmitted to the GMSC 18. In accordance with this embodiment of the invention, the GMSC 18 adds the MSRN to the ISUP ANM message 514, and forwards it to the MGC 16. Again, the MSRN may be in the form of a generic number with a designated number qualifier. The MGC 16 converts the ISUP Answer message 514 to SIP signalling, and transmits a 200 Ok message 515 to the S-CSCF 10 with the PANI header modified to contain the MSRN. As previously stated, this removes the need for sending an intermediate ISUP message (such as ISUP CPG) and SIP message (such as 183 Session progress) containing the MSRN, by using signals necessarily sent as part of the call establishment process.

The GMSC 18 may be triggered to send the MSRN to the packet-switched telecommunications network in any of a number of ways. For example, the GMSC may determine from designated routing information contained in the call establishment request message 501 received from MGC, that this call establishment request message relates to a call destined for a GSM subscriber's mobile terminal and that therefore it shall return the MSRN towards the IMS network.

In one embodiment, the GMSC 18 receives an indication in the ISUP IAM message 501 that the terminating call relates to a terminating call for a subscriber for which (the call) terminating services have been executed already. This indication may for example have the form of a prefix in the Called party number in the ISUP IAM 501. As previously stated, the GMSC 18 will for this terminating call suppress T-CSI. However, the GMSC 18 may use the same indication in the Called party number in ISUP IAM as a trigger for the returning of MSRN.

In another embodiment, the MGC 16 includes an explicit 'request for MSRN' in the ISUP IAM 501 sent towards GMSC 18. Such request may e.g. take the form of a designated bit in the 'Optional forward call indicators' information element in the ISUP IAM. The GMSC 18 may, when receiving this request, return the MSRN in an ISUP CPG (i.e. it will return the MSRN as soon as possible, once it has received the MSRN from the location register, rather than wait for an answer message). In this embodiment, the MGC will have to be aware that it is handling a terminating GSM access call, so it can assert the request for MSRN in the outgoing ISUP IAM. The assertion of the request for MSRN may e.g. result from B-number analysis in the MGC. The B-number analysis in MGC, in turn, uses the Contact address in the S-CSCF related to the GSM mobile terminal; this Contact address is received by MGC in the SIP Invite. The Contact address may include a designated prefix, used for suppressing T-CSI in GMSC when delivering the terminating call to the subscriber's GSM phone. B-number analysis in MGC may, when detecting this prefix, assert the 'request for MSRN'.

The above described embodiments therefore provide methods and apparatus for providing information back to the packet-switched telecommunications network. For example, the S-CSCF 10 can determine from the MSRN the country and network in which the GSM subscriber, when answering the call, is currently roaming. However, in alternative embodiments, different parameters may be sent back to the packet-switched telecommunications network. For example, the MAP PRN-Res message 504 received by the HLR 20 contains the address of the VMSC 22 in addition to the MSRN. This VMSC address may, just like the MSRN, be used as an indication of the location of the called party. Therefore, in one embodiment of the present invention, the VMSC address is returned to the packet-switched telecommunications network, in the same manner as the MSRN is returned to the MGC 16, as described above. Returning the VMSC address to the MGC 16, as opposed to returning the MSRN, has some advantages, as the VMSC address is generally considered to be less confidential than the MSRN.

Figure 4:
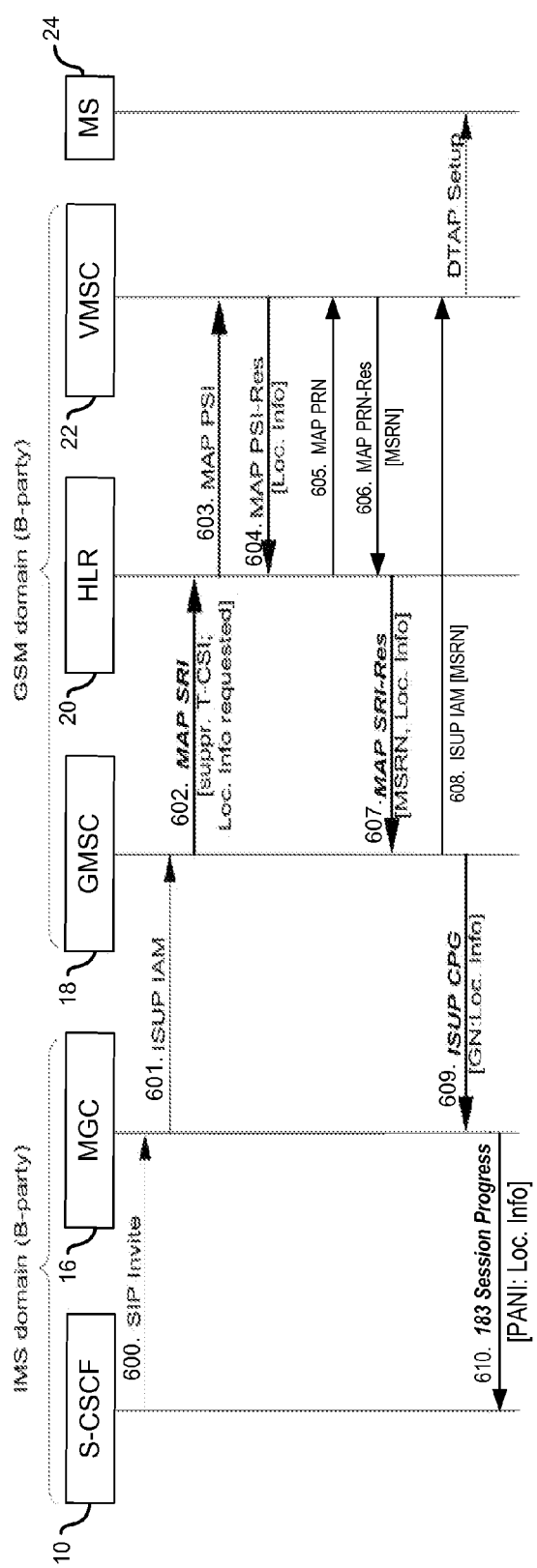
FIG. 4 is a signalling diagram of a method in accordance with a further embodiment of the present invention.

In further embodiments, the GMSC 18 may be adapted to explicitly request, in MAP SRI 502, the location information of the called party. FIG. 4 is a signalling diagram in accordance with an embodiment of this aspect of the present invention.

As in previous embodiments, the signalling related to offering a terminating call to a GSM mobile terminal is initiated in the S-CSCF 10, which sends a SIP Invite message 600 to the MGC 16; the MGC 16 in turn transmits an ISUP IAM message 601 to the GMSC 18. However, in accordance with this embodiment of FIG. 4, the MAP SRI message 602 sent from the GMSC 18 to the HLR 20 is adapted to explicitly request location information, despite the fact that the GMSC suppresses the T-CSI in this MAP SRI.

The return of location information from the HLR 20 to the GMSC 18 is normally associated with IN (CAMEL) service invocation from the GMSC 18. The location information is, normally, included in MAP SRI-Res together with T-CSI. However, when the GMSC 18 is handling a terminating GSM access call, as in the call case in the present invention, the T-CSI will be suppressed in the HLR 20. As a result of the suppression of T-CSI for this call case, an HLR 20 will normally not provide location information to the GMSC 18.

The GMSC 18 according to the present invention therefore signals in MAP SRI 602 to the HLR 20 that it should, in addition to providing the MSRN, also provide location information to the GMSC 18. Thus, in response to the adapted MAP SRI 602, the HLR 20 transmits a MAP PSI message (Provide Subscriber Information) 603 to the VMSC 22, which returns location information of the called subscriber in a MAP PSI-Res message 604. The HLR 20 also sends a MAP PRN message 605 to the VMSC 22, which returns the MSRN in a MAP-PRN-Res message 606. On receipt of the MSRN and the location information, the HLR 20 forwards them to the GMSC 18 in a MAP SRI-Res message 607.

The GMSC 18 uses the MSRN to establish the call to the VMSC 22 as before (i.e. with an ISUP IAM message 608), but uses the location information to send an ISUP CPG message 609 to the MGC 16. The ISUP CPG message 609 will include the location information, carried in a designated information element such as a generic number. The MGC 16 converts the ISUP CPG message 609 to a SIP 183 response 610 containing the location information in the PANI header, and transmits this towards the S-CSCF 10.

For this embodiment, therefore, the parameters transmitted towards the packet-switched telecommunications network, conveyed in a designated ISUP information element, comprise location information instead of the MSRN. Location information gives a finer granularity of location than MSRN, and may be standardized specifically for the purpose of reflecting a GSM mobile terminal's location. It may contain, among others, the Cell Global Identifier (CGI), the location number (a number representing the location) and/or geographic coordinates of the GSM mobile terminal of the called party. The CGI relates to the (geographical) position of the base station and hence of the subscriber.

Figure 5:
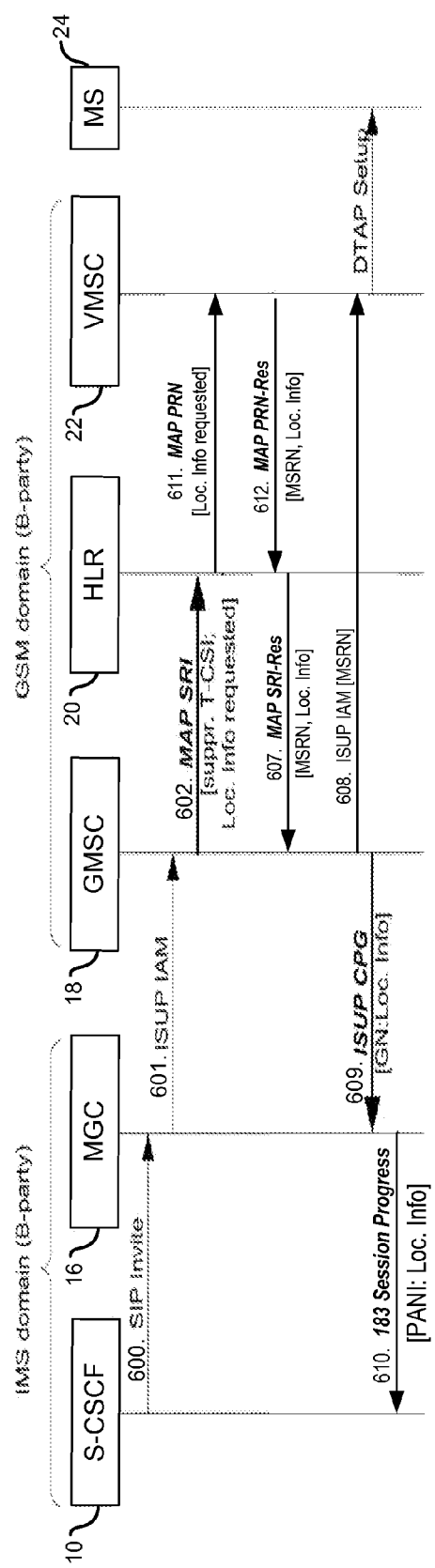
FIG. 5 is a signalling diagram of a method in accordance with a yet further embodiment of the present invention.

The method described with respect to FIG. 4 may be employed irrespective of whether or not the VMSC 22 is within the home network, i.e. whether or not it is within the same network as the GMSC 18 and the HLR 20. However, if the VMSC 22 is within the home network, alternative signalling may be employed according to another embodiment of the present invention. FIG. 5 is a signalling diagram illustrating this alternative embodiment.

The method is similar to that described with respect to FIG. 4. However, on receipt of the adapted MAP SRI message 602 from the GMSC 18, the HLR sends a single request message 611 in respect of the MSRN and the location information, rather than requesting both in separate messages. In addition, the VMSC 22 returns both the MSRN and the location information to the HLR 20 in a single response message 612. In one embodiment, on receipt of the MAP SRI message, the HLR 20 sends an adapted MAP PRN message 611 to the VMSC 22. The MAP PRN message 611 is adapted to contain a request for location information in addition to the MSRN. The VMSC 22 responds with a MAP PRN-Res message 612 that is adapted to additionally contain the location information as well as the MSRN. Both the MAP PRN 611 and MAP PRN-Res 612 messages have ellipsis in their formal syntax definition, allowing the additional information elements to be included. 'Ellipsis' is an aspect of the Abstract syntax notation (ASN), used to specify the MAP message. An ellipsis within the formal definition of a message allows for extending the message definition in a backwards compatible manner. Other than these messages, the method operates similarly to that described with respect to FIG. 4.

If the VMSC 22 is unable to provide the requested location information, for example because it cannot be obtained from the visited location register (VLR, not illustrated; in communication with the VMSC 22), the HLR 20 may return the VLR number to the GMSC 18 in addition to the MSRN, i.e. instead of the location information. The VLR number, which is functionally identical to the VMSC address (since MSC and VLR are integrated), is known to the HLR 20 (since HLR keeps track of the VMSC/VLR where a subscriber is registered), and may suffice in certain situations. Therefore, in this embodiment, the GMSC 18 returns the VLR number to the packet-switched telecommunications network, in a similar manner to the location information described above.

The method described with respect to FIG. 5 is generally only applicable when the VMSC 22 is within the home network, as it cannot be guaranteed that a VMSC in a remote network will be able to understand or respond to the modified MAP PRN message 611. However, if the remote network is adapted similarly to the home network of the present invention, the method will still be applicable.

Both methods described in FIGS. 4 and 5 use ISUP CPG messages to report the location information back to the packet-switched telecommunications network; however, the principle described with respect to FIG. 3 may also apply to these latter methods. That is, instead of using ISUP CPG 609 to convey the location information, an ISUP ANM message (i.e. an answer message) may be modified to include the location information instead.

This method may be applied in optimized network where the GMSC 18 and Media Gateway Control Function (MGCF) are integrated. In such case, the ISUP signalling between the MGC 16 and the GMSC 18 takes place internally within the node.

Figure 6:
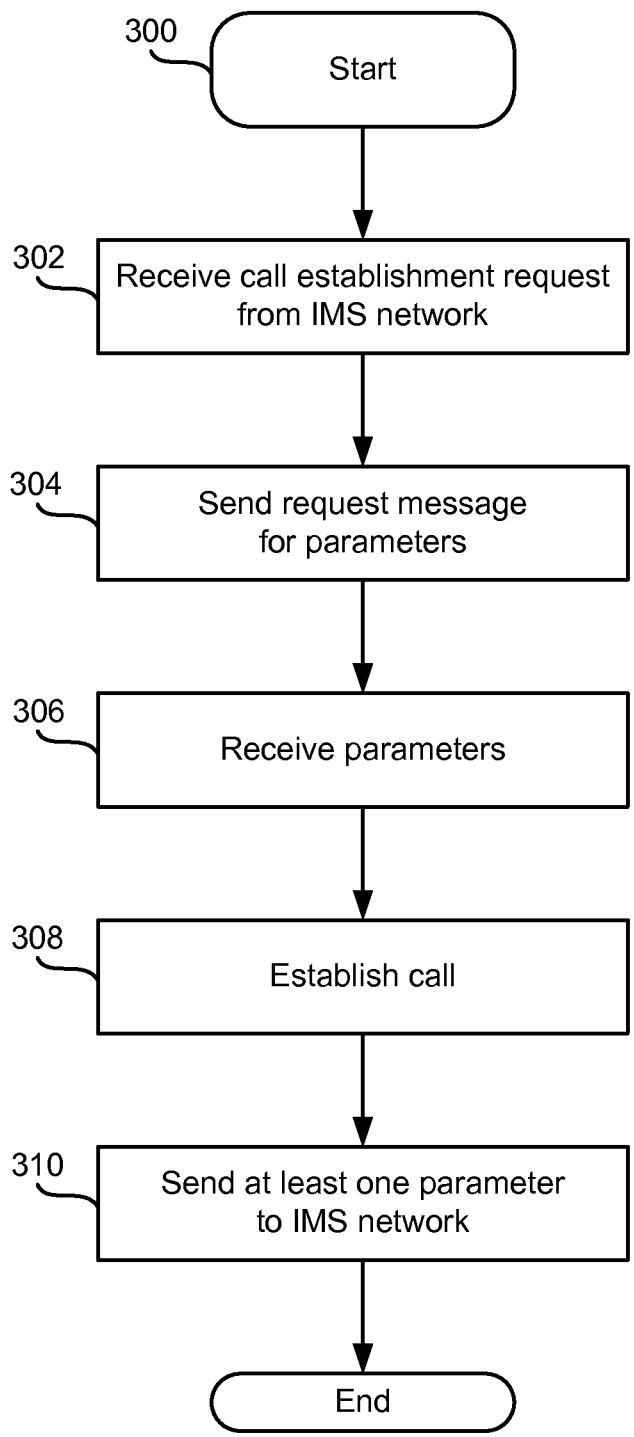
FIG. 6 is a flowchart of a method in a mobile switching node according to an embodiment of the present invention.

FIG. 6 is a flowchart of a method in accordance with an aspect of the present invention, performed in a switching node of a circuit-switched telecommunications network (e.g. a mobile switching centre of a GSM network).

The method starts in step 300. In step 302, the mobile switching node receives a call establishment request message from a packet-switched telecommunications network, e.g. an IMS network, requesting the establishment of a call towards a mobile terminal in the circuit-switched telecommunications network. For example, this message could be in the form of an ISUP IAM message from the MGC 16.

In step 304, the mobile switching node sends a request message to a location register (e.g. a home location register) for an instruction that allows the continuation of the establishment of the call to the mobile terminal. In one embodiment the request for instruction could contain a request for MSRN; alternatively, the request for instruction could contain a request for MSRN as well as a request for location information.

In step 306, the mobile switching node receives the requested instruction from the location register, for example in the form of a MAP SRI-Res message. As described above, the received instruction could be just the MSRN, or the MSRN as well as location information.

In step 308, the mobile switching node uses the MSRN to establish the call with the VMSC. This will be achieved using an ISUP IAM message, with the MSRN as the called party number.

In step 310, the mobile switching node sends at least one element of the received information back to the packet-switched telecommunications network. For example, the mobile switching node may send the MSRN back to the packet-switched telecommunications network. In another embodiment, the mobile switching node may send location information back to the packet-switched telecommunications network if it has received location information as well as the MSRN. The information sent back to the IMS network may be sent as part of a call-in-progress message (e.g. ISUP CPG) or an answer message (e.g. ISUP ANM).

Figure 7:
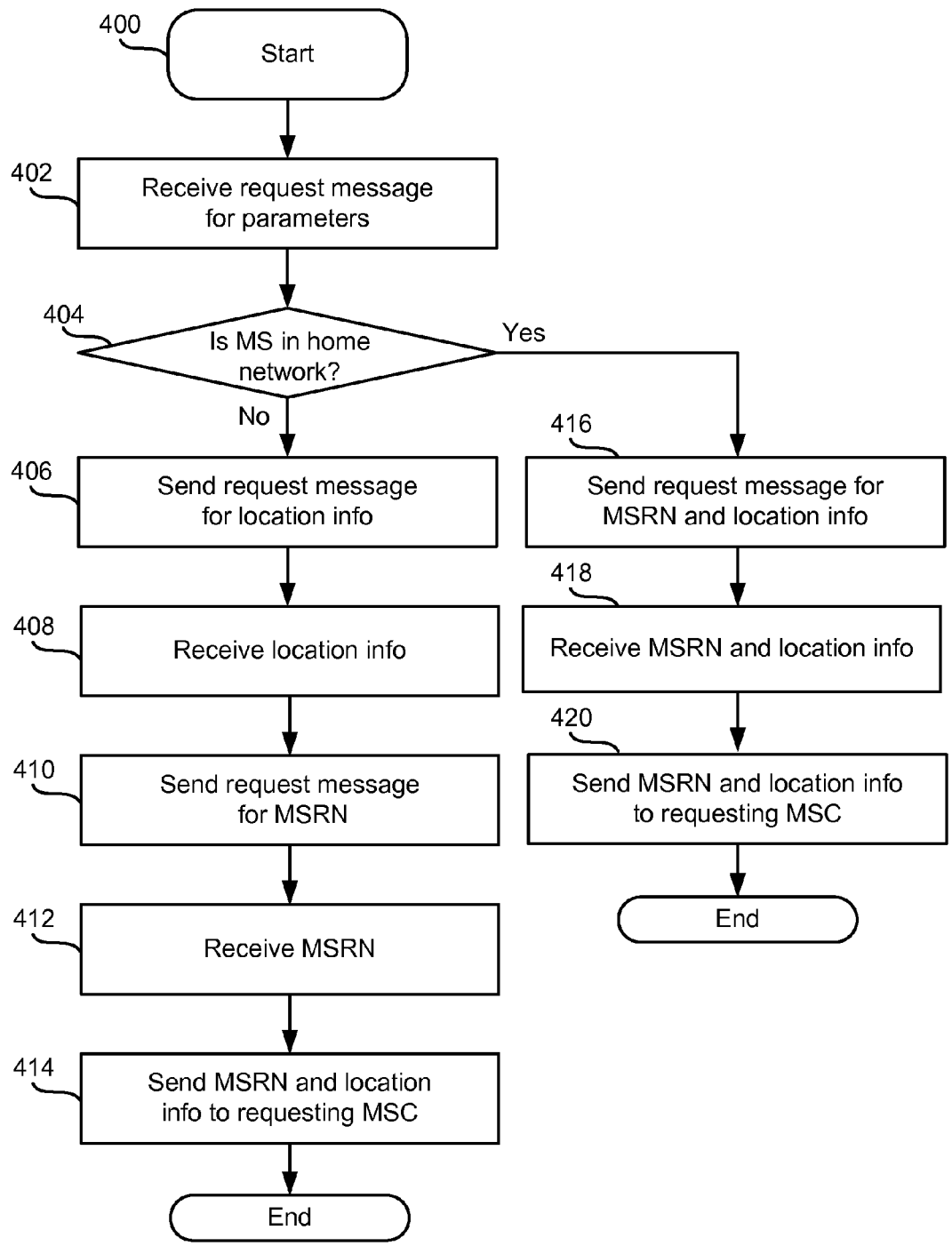
FIG. 7 is a flowchart of a method in a location register according to another embodiment of the present invention.

FIG. 7 is a flowchart of a method in a location register of a circuit-switched telecommunications network, in accordance with embodiments of the present invention. For example, the method may be performed in a home location register of a GSM network.

The method starts in step 400. In step 402, as part of a process to establish a call with a mobile terminal of the circuit-switched telecommunications network, the location register receives a request message for an instruction that allows the continuation of the establishment of the call to the mobile terminal. In one embodiment the request for instruction contains a request for MSRN as well as a request for location information. The message could be received, for example, as a MAP SRI message, modified to include the request for location information.

In step 404, the location register determines whether the mobile terminal is currently registered in the home network, i.e. the network in which the location register resides. With reference to the location register 200 described in FIG. 9, the processor 206 consults the database 208 to determine whether the mobile terminal is currently registered in the home network.

If the mobile terminal is not currently registered in the home network, the method proceeds to step 406 and the location register sends a request to a remote mobile switching node (e.g. the VMSC) for location information. The message may be in the form of a MAP PSI message. In step 408, the location register receives the requested location information.

In step 410, the location register sends to the remote mobile switching node a request message for the MSRN of the mobile terminal. For example, the request may be in the form of a MAP PRN message. In step 412, the location register receives the requested MSRN.

In step 414, the location register forwards the MSRN and the location information to the requesting mobile switching node. For example, they may be sent in a MAP SRI-Res message.

If the mobile terminal is currently registered in the home network in step 404, the method proceeds to step 416 and the location register sends a request to a mobile switching node (e.g. the VMSC) for location information and MSRN. The message may be in the form of a modified MAP PRN message. In step 418, the location register receives the requested location information and MSRN in a single message, for example a modified MAP PRN-Res message.

In step 420, the location register forwards the MSRN and the location information to the requesting mobile switching node. For example, they may be sent in a MAP SRI-Res message.

Therefore, according to the present invention, entities within a packet-switched telecommunications network (e.g. an IMS network) that handle the terminating call for a call that is delivered to circuit-switched telecommunications network access (e.g. GSM), receive location information related to the connected party, i.e. the party (mobile terminal) receiving the call. This information is received transparently in SIP signalling.

Examples of SIP entities benefiting from this method are S-CSCF and SIP application server (SIP-AS); the SIP-AS may e.g. contain a VPN service, a multimedia telephony application or a charging application.

Receiving the destination mobile terminal's location information transparently in SIP signalling such as 180 Ringing, 183 Progress or 200 Ok, has the advantage that the packet-switched telecommunications network entity does not have to perform further action to obtain the called subscriber's location information. An example of such further action could be the any time interrogation (ATI) procedure. Packet-switched telecommunications network entities may, however, not support MAP procedures.

A further advantage is that no correlation of call detail records (CDR) is needed. The service record/session record generated by the SIP-AS or by the S-CSCF could off-line be correlated with CDRs generated in the GSM network for the terminating access leg for this call. CDR correlation is, however, a processing-intensive task. Hence, receiving the required information transparently in designated SIP signalling facilitates the S-CSCF or SIP-AS to place it in service record or to use it immediately in service logic processing.

This method may therefore constitute a substantial reduction in complexity.

Figure 8:
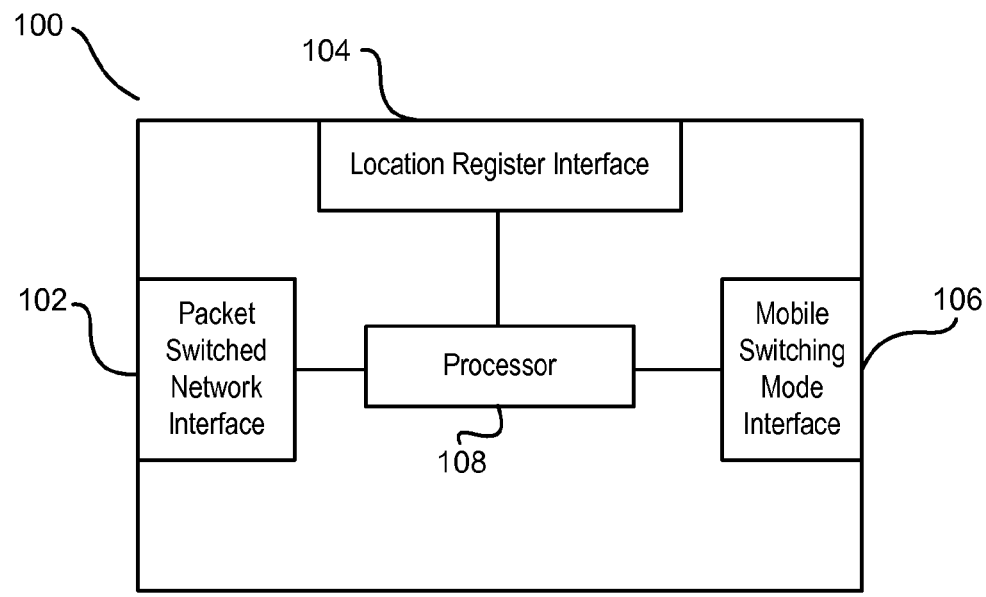
FIG. 8 is a mobile switching node according to an embodiment of the present invention.

FIG. 8 shows a mobile switching node 100 for use in a circuit-switched telecommunications network. For example, the mobile switching node 100 may be a Gateway Mobile Services Switching Centre (GMSC) for use in a GSM telecommunications network, for performing the methods described above.

The mobile switching node 100 comprises first, second and third interface circuitry 102, 104, 106, as well as a processor 108.

The first interface circuitry 102 is for communicating with a packet-switched network, for example an IMS network. That is, the mobile switching node 100 may receive, via the first interface circuitry 102, requests for establishment of calls from the packet-switched network, and may send various confirmation messages such as a Call progress message and control messages such as an Answer message, such as are necessary to establish and (at a later moment) release the call.

The second interface circuitry 104 is for communicating with a location register, for example a home location register of a GSM telecommunications network. The second interface circuitry 104 may therefore send to the location register request messages for information about a particular mobile terminal, and may receive from the location register the requested information.

The third interface circuitry 106 is for communicating with a remote mobile switching node of the circuit-switched telecommunications network, for example a mobile services switching centre of a GSM telecommunications network. The third interface circuitry 106 therefore may send and receive messages for establishment of a call with the remote mobile switching node, or for release of the call, once established.

The mobile switching node 100 is therefore capable of operating as the gateway mobile switching centre 18 shown in FIGS. 2 to 7, in that it can communicate with a packet-switched telecommunications network (for example an IMS network), a location register (for example a home location register) and a remote mobile switching node (such as a visited mobile switching centre).

Figure 9:
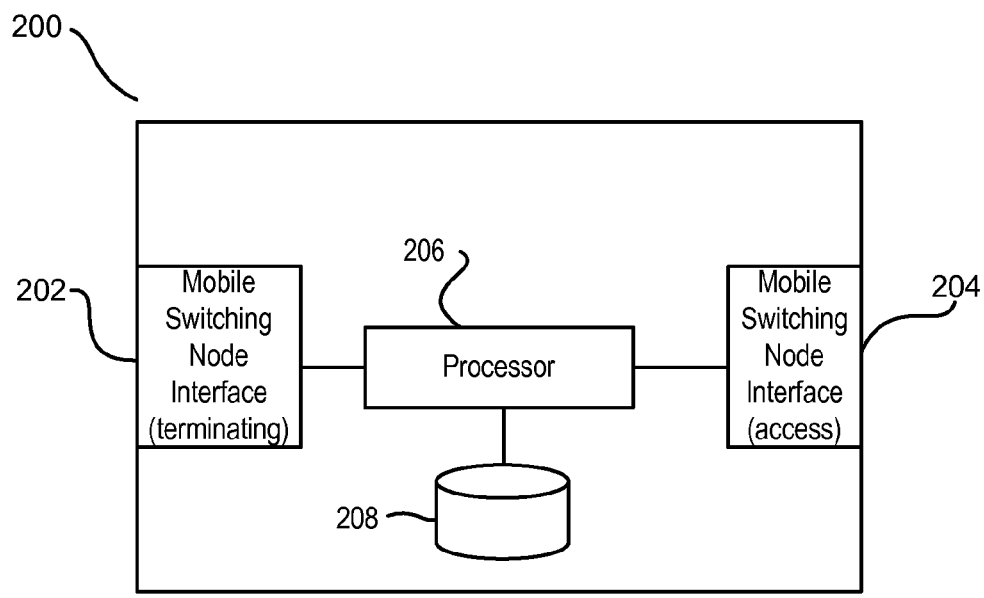
FIG. 9 is a location register according to another embodiment of the present invention.

FIG. 9 shows a location register 200 for use in a circuit-switched telecommunications network. For example, the location register 200 may be used as a home location register in a GSM telecommunications network, for performing the methods described above.

The location register 200 comprises first and second interface circuitry 202, 204, as well as a processor 206 and a database 208.

The first interface circuitry 202 is for communicating with a terminating call handling mobile switching node within the home circuit-switched telecommunications network, i.e. a mobile switching node within the same circuit-switched telecommunications network as the location register 200. For example, the mobile switching node may be a gateway mobile switching centre within a GSM telecommunications network. The first interface circuitry 202 may receive request messages from the terminating call handling mobile switching node for information allowing the call to be established. Once this information is obtained, the first interface circuitry 202 can send it back to the terminating call handling mobile switching node.

The second interface circuitry 204 is for communicating with an access call handling mobile switching node of the circuit-switched telecommunications network, for example a visited mobile switching centre of a GSM telecommunications network. The access call handling mobile switching node may be in the home circuit-switched telecommunications network, or in a remote circuit-switched telecommunications network. The second interface circuitry 204 may send request messages to the remote mobile switching node for information regarding the called party, and may receive the requested information from the remote mobile switching node.

The location register 200 operates as a database for information regarding subscribers of the circuit-switched telecommunications network. In particular, it maintains information regarding the location of subscribers, and stores this in the database 208. The location information stored in the database 208 amounts only to the particular mobile switching node which is currently serving each subscriber (i.e. the VMSC where a subscriber is currently registered). The database 208 and processor 206 therefore act as means for determining whether or not a mobile terminal is part of the same network as the location register 200, i.e. whether or not the mobile terminal is part of the "home network".

The location register 200 is therefore capable of operating as the home location register 20 shown in FIGS. 2 to 7, in that it can communicate with a terminating call handling mobile switching node (such as a Gateway Mobile Switching Centre) and a remote mobile switching node (such as a visited mobile switching centre).

The invention is described with reference to a GSM network and a GSM mobile terminal. However, it is understood by the person skilled in the art that the invention is equally applicable to UMTS networks. It is further understood by the person skilled in the art that the invention is equally applicable to different types of access networks that may be used for circuit-switched calls, such as, but not limited to, TDMA, W-CDMA, HSPA and Generic access network (GAN), the latter also being referred as Unlicensed mobile access (UMA) and encompassing WLAN and Bluetooth.

Equally, the term "mobile terminal" is taken to include any of mobile terminal, mobile station, mobile phone, user equipment, a laptop, etc.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed in a switching node of a circuit-switched telecommunications network, the method comprising:

receiving, at the switching node from a packet-switched telecommunications network, a request to establish a call with a mobile terminal connected to the circuit-switched telecommunications network;

in response to receiving a request to establish a call, sending, from the switching node, a request message to a location register to obtain an instruction comprising one or more parameters associated with continuing the establishment of the call to the mobile terminal connected to the circuit-switched telecommunications network;

receiving, at the switching node, the one or more parameters from the location register;

using, at the switching node, at least a first parameter of the one or more parameters to establish the call with the mobile terminal connected to the circuit-switched telecommunications network; and sending, from the switching node, at least a second parameter of the one or more parameters to the packet-switched telecommunications network, the at least second parameter associated with a location of the mobile terminal connected to the circuit-switched telecommunications network.

2. The method of claim 1 wherein the at least second parameter sent to the packet-switched telecommunications network is the same as the at least first parameter used to establish the call with the mobile terminal.

3. The method of claim 2 wherein the at least first and second parameters is a Mobile Station Roaming Number (MSRN).

4. The method of claim 1 wherein the at least first parameter used to establish the call with the mobile terminal is different than the at least second parameter sent to the packet-switched telecommunications network.

5. The method of claim 4 wherein the one or more parameters comprise a Mobile Station Roaming Number (MSRN) and location information, the location information comprising one or more of a cell ID associated with the mobile terminal, a location number associated with the mobile terminal, and geographic coordinates associated with the mobile terminal; and wherein the MSRN is used to establish the call with the mobile terminal, and wherein the location information is sent to the packet-switched telecommunications network.

6. The method of claim 1 wherein sending at least a second parameter comprises sending the second parameter to the packet-switched telecommunications network using a call-establishment-in-progress message.

7. The method of claim 1 wherein sending at least a second parameter comprises sending the second parameter to the packet-switched telecommunications network using an answer message.

8. The method of claim 1 wherein the packet-switched telecommunications network is an IP Multimedia Subsystem (IMS) network, and wherein the circuit-switched telecommunications network is a Global System for Mobile Communications (GSM) telecommunications network.

9. The method of claim 1 wherein the switching node is a mobile switching center.

10. A switching node in a circuit-switched telecommunications network, the switching node comprising:
 a first interface configured to:
  interface with a packet-switched telecommunications network; and
  receive, from the packet-switched telecommunications network, a request to establish a call with a mobile connected to the circuit-switched telecommunications network;
 a second interface configured to:
  interface with a location register;
  in response to receiving a request to establish a call at the first interface, send a request message to the location register to obtain an instruction comprising one or more parameters associated with continuing the establishment of the call to the mobile terminal connected to the circuit-switched telecommunications network; and
  receive the one or more parameters from the location register;
 a third interface configured to:
  interface with a remote switching node; and
  use at least a first parameter of the one or more parameters to establish the call with the mobile terminal connected to the circuit-switched telecommunications network; and
 the first interface being further configured to send at least a second parameter of the one or more parameters to the packet-switched telecommunications network, the at least second parameter being associated with a location of the mobile terminal connected to the circuit-switched telecommunications network.

* * * * *

UNITED STATES PATENT AND TRADEMARK OFFICE
CERTIFICATE OF CORRECTION

PATENT NO. : 9,497,616 B2
APPLICATION NO. : 13/377903
DATED : November 15, 2016
INVENTOR(S) : Noldus Page 1 of 1

It is certified that error appears in the above-identified patent and that said Letters Patent is hereby corrected as shown below:

In Fig. 2, Sheet 2 of 8, in Step "509", Line 3, delete "[PAN:MSRN]" and insert -- [PANI:MSRN] --, therefor.

In Fig. 8, Sheet 8 of 8, for Tag "106", Line 3, delete "Mode" and insert -- Node --, therefor.

In Column 7, Line 35, delete "VSMC" and insert -- VMSC --, therefor.

Signed and Sealed this
Thirteenth Day of June, 2017

Joseph Matal
*Performing the Functions and Duties of the
Under Secretary of Commerce for Intellectual Property and
Director of the United States Patent and Trademark Office*